United States Patent
Daub et al.

(10) Patent No.: US 9,603,153 B2
(45) Date of Patent: Mar. 21, 2017

(54) WIRELESS ACCESS POINT MANAGEMENT SYSTEM AND METHOD

(71) Applicant: NETGEAR, Inc., San Jose, CA (US)

(72) Inventors: Jonathan Daub, New York, NY (US); Patrick Lazar, San Jose, CA (US)

(73) Assignee: Netgear, Inc., San Jose, CA (US)

( * ) Notice: Subject to any disclaimer, the term of this patent is extended or adjusted under 35 U.S.C. 154(b) by 223 days.

(21) Appl. No.: 14/061,828

(22) Filed: Oct. 24, 2013

(65) Prior Publication Data

US 2015/0117228 A1   Apr. 30, 2015

(51) Int. Cl.
  *H04W 72/08* (2009.01)
  *H04W 84/12* (2009.01)

(52) U.S. Cl.
  CPC .......... *H04W 72/082* (2013.01); *H04W 84/12* (2013.01)

(58) Field of Classification Search
  CPC .............................. H04W 72/082; H04L 45/02
  See application file for complete search history.

(56) References Cited

U.S. PATENT DOCUMENTS

| | | | |
|---|---|---|---|
| 7,512,379 B2 | 3/2009 | Nguyen | |
| 8,351,451 B2 | 1/2013 | Patil et al. | |
| 2004/0039763 A1* | 2/2004 | Koizumi | H04B 1/707 708/300 |
| 2005/0265288 A1* | 12/2005 | Liu | H04W 72/082 370/332 |
| 2006/0109799 A1 | 5/2006 | Tseng et al. | |
| 2007/0076657 A1 | 4/2007 | Woodings et al. | |
| 2008/0146161 A1* | 6/2008 | Bugenhagen | H04W 16/18 455/67.11 |

(Continued)

FOREIGN PATENT DOCUMENTS

| | | |
|---|---|---|
| EP | 1 542 405 B1 | 8/2004 |
| EP | 1 617 600 A1 | 1/2006 |

(Continued)

OTHER PUBLICATIONS

Understanding the IEEE 802.11 Standard for Wireles Networks—Technical Documentation, Juniper, Oct. 15, 2013.*
"Wi-Fi Analyzer Finds the Best Hotspots and Improves Your Home Network"; http://lifehacker.com/5572593/wi-fi-analyzer-finds-the-best-hotspots-and-improves-your-home-network; Kevin Purdy; Jun. 25, 2010.

(Continued)

*Primary Examiner* — Brandon Renner
*Assistant Examiner* — Jay Vogel
(74) *Attorney, Agent, or Firm* — Boyle Fredrickson, S.C.

(57) ABSTRACT

Methods and apparatuses are provided for graphically displaying the noise level on each WLAN channel, along with the arrangement of other (neighboring) wireless host devices on each channel with their respective signal strengths as a distance indicator. As a result, collected information may be gathered and displayed intuitively to allow a user to quickly assess the environment and manually configure the wireless host device. In addition, methods and apparatuses are provided for suggesting to a user or automatically selecting a wireless host device configuration based on the noise level on each WLAN channel and the arrangement of other wireless host devices on each channel with consideration of their respective signal strengths. As a result, an optimal configuration for a deployed wireless host device may be determined and consistently suggested or automatically configured.

17 Claims, 5 Drawing Sheets

(56) References Cited

U.S. PATENT DOCUMENTS

| | | | | |
|---|---|---|---|---|
| 2008/0159133 | A1* | 7/2008 | Yeung | H04W 28/10 370/230 |
| 2009/0270093 | A1* | 10/2009 | Lee | H04M 1/7253 455/434 |
| 2010/0020707 | A1* | 1/2010 | Woodings | H04L 43/045 370/252 |
| 2011/0025453 | A1* | 2/2011 | Kozlowski | G08C 17/02 340/3.1 |
| 2011/0051619 | A1* | 3/2011 | Gong | H04W 16/10 370/252 |
| 2011/0244892 | A1* | 10/2011 | MacManus | H04W 4/02 455/457 |
| 2012/0170471 | A1* | 7/2012 | Brown | H04W 48/20 370/252 |
| 2012/0276848 | A1* | 11/2012 | Krattiger | H01Q 1/007 455/41.2 |
| 2014/0024406 | A1* | 1/2014 | Lancaster | H04W 16/14 455/513 |

FOREIGN PATENT DOCUMENTS

| | | |
|---|---|---|
| EP | 2 026 621 A2 | 2/2009 |
| EP | 2 207 395 A2 | 1/2010 |
| EP | 2 317 791 A2 | 10/2010 |

OTHER PUBLICATIONS

"Let WiFi Finder Help You Locate Wireless Connections"; http://www.techrepublic.com/blog/tablets-in-the-enterprise/let-wifi-finder-help-you-locate-wireless-connections/?tag=nl.e101; Jack Waller, May 14, 2012.
"Netsurveyor—802.11 Netowrk Discovery/Wifi"; http://nutsaboutnets.com/netsurveyor-wifi-scanner; 2013.
"How to Troubleshoot a Weak Wireless Signal"; http://www.knowall.net/tips-tricks-and-tutorials/how-to-toubleshoot-a-week-wireless-signal; Jun. 7, 2013.

\* cited by examiner

WIRELESS ACCESS POINT MANAGEMENT SYSTEM AND METHOD

BACKGROUND OF THE INVENTION

The present invention is directed to wireless networking, and more particularly, to methods and apparatuses for configuring wireless networking host devices.

Many client devices today, such as laptops, tablets, and mobile phone, communicate data wirelessly. Such wireless client devices typically follow a wireless local area network (WLAN) protocol, such as. IEEE 802.11 (wireless Ethernet), often referred to as "Wi-Fi." Some of the common revisions of IEEE 802.11 that have been implemented include 802.11a, 802.11b, 802.11g, 802.11n and 802.11ac. Such revisions often differ by varying one or more of wireless networking frequencies and ranges, frequency bandwidths, channels, data rates and modulation schemes. As a result of such variations, the range of operation and data throughput for the wireless network often vary.

For example, with respect to 802.11b networks, wireless networking frequencies are in the 2.4 GHz range. Within that range, multiple channels exist, each with a varying center frequency and a total bandwidth. For example, the center frequency for the first 802.11b channel, "Channel 1," is 2.412 GHz with a bandwidth of 20 MHz. Accordingly, 802.11b networks may typically operate wirelessly with an indoor range exceeding 100 feet and an outdoor range exceeding 400 feet. These ranges may be limited, for example, by factors such as surrounding noise, physical obstructions, and interference from other devices.

To access wired networks, such as IEEE 802.3 (wired Ethernet) networks, and ultimately wide area networks (WAN) and the Internet, wireless client devices typically first connect to wireless host devices, such as wireless access points (AP), routers, gateways and/or bridges. Consequently, it is increasingly commonplace for numerous such wireless host devices to exist in widely dispersed locations to support such access to wired networks. Each wireless host device is often configured to run according to a particular protocol on a given channel and, as a result, will have an incumbent signal strength which may be observed from other locations.

When deploying new wireless host devices so as, for example, to increase wireless accessibility, care must be taken to ensure the maximum effect for the wireless host device in serving wireless client devices is achieved. Numerous factors may contribute to degrading performance of wireless host devices, including surrounding high-frequency noise from other sources, physical obstructions such as walls and buildings, the presence, location and configuration of other neighboring wireless host devices, and signal interference.

What is needed is an improved mechanism for consistently and reliably determining an optimal configuration for newly-deployed wireless host devices. In addition, what is needed is a mechanism for intuitively providing such information to a user to facilitate subsequent manual configuration of wireless host devices.

SUMMARY OF THE INVENTION

In accordance with aspects of the invention, methods and apparatuses are provided for graphically displaying the noise level on each WLAN channel, along with the arrangement of other (neighboring) wireless host devices on each channel with their respective signal strengths as distance indicators. As a result, collected information may be gathered and displayed intuitively to allow a user to quickly and precisely assess the environment and manually configure the wireless host device.

In addition, methods and apparatuses are provided for suggesting a wireless host device configuration to a user or optionally automatically selecting a wireless host device configuration based on the noise level on each WLAN channel and the arrangement of other wireless host devices on each channel with consideration of their respective signal strengths. As a result, an optimal configuration for a deployed wireless host device may be determined and consistently suggested or even automatically configured.

In accordance with an embodiment, a method of representing a Wi-Fi channel lineup may be provided. One such feature may be to help a user choose which channel to assign to a wireless host device such as an access point (AP). Other, neighboring wireless host devices, discovered using a Wi-Fi scan, may be shown in their respective channel using signal strength as a distance indicator. When choosing a broadcast channel, it is then easier for a user to take into account the arrangement of other wireless host devices on the channel, and not just merely the number of them. The noise on the channels may also be shown, particularly as Wi-Fi strength may be measured as a signal-to-noise (SNR) ratio. This helps the user choose channels with less noise. The noise may be represented using a gradient, for example, to show that SNR improves closer to the gateway.

Specifically, one aspect of the present invention includes a wireless host device for connecting a wireless client device to a wired network. The wireless host device includes an electronic processor communicating with a wireless transceiver and executing a program stored in a non-transient medium on the electronic processor to: (a) scan a range of wireless networking frequencies divided according to channels for the presence of neighboring wireless host devices, wherein neighboring wireless host device communicate via a respective channels; (b) evaluate a signal strength from each neighboring wireless host device scanned in a respective channel to the wireless host device; (c) evaluate a noise level for each channel independent of the presence of neighboring wireless host devices; (d) determine a channel of operation for the wireless host device to communicate with the wireless client device; and (e) transmit data using the determined channel of operation. It should be noted that multiple scanned wireless host devices may communicate via the same channel, and in some instances, wireless host devices may communicate via multiple channels. The channel of operation may be determined using an algorithm considering the noise level on each channel, the signal strength of each neighboring wireless host device scanned, and the number of neighboring wireless host devices communicating via each respective channel.

It is thus a feature of at least one embodiment of the invention to consider several key factors for successfully determining an optimal configuration fir a newly deployed wireless host device. Upon such a determination, a suggestion or recommendation may be made to an end-user for manual configuration, or the device may optionally be automatically configured accordingly via software.

The method may further comprise graphically displaying the neighboring wireless host devices in their respective channels, wherein the neighboring wireless host devices are arranged as a function of their signal strengths. In addition, the method may further comprise graphically displaying the noise level on each channel.

It is thus a feature of at least one embodiment of the invention to intuitively indicate several key factors for successfully determining an optimal wireless host device configuration to a user.

The noise level on each channel may be shown as a gradient.

It is thus a feature of at least one embodiment of the invention to visually provide a user with knowledge of dynamic noise characteristic patterns by channel.

The wireless host device may communicate via the IEEE 802.11 protocol, and the wireless networking frequencies may be divided according to channels in one or more specified ranges, such as the 2.4 GHz range and/or the 5 GHz range.

It is thus a feature at least one embodiment of the invention to facilitate deployment in commonplace networks, such as 802.11b, 802.11ac, 802.11g and 802.11n networks, among others.

Also disclosed are computer programs and software for implementing the above stated methods, and hardware elements for implementing the above stated methods.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation, Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
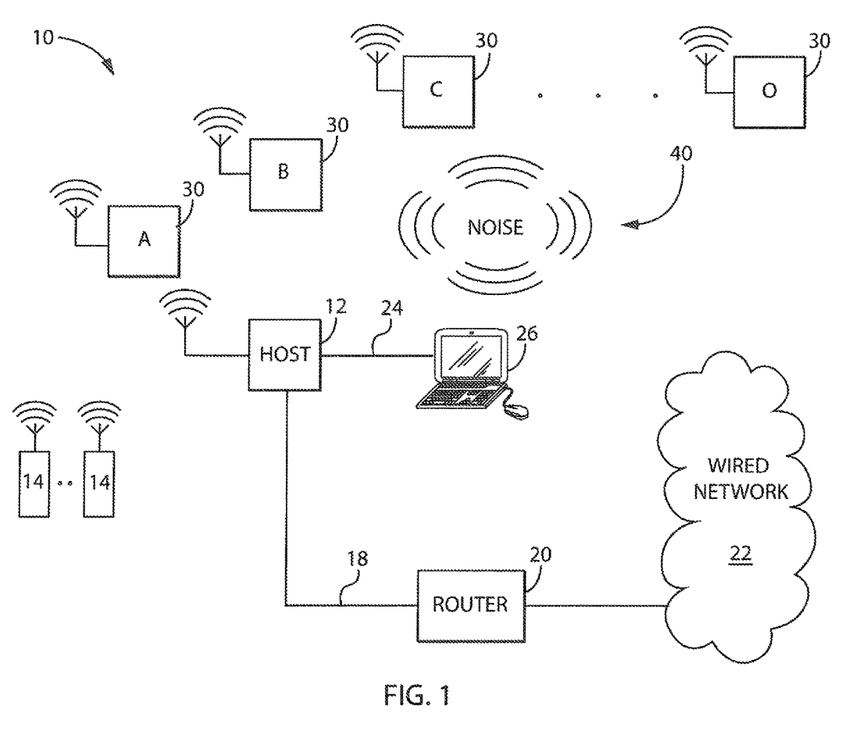
FIG. 1 is a block diagram of a system illustrating the wireless connection of wireless client devices to a wired network using a wireless host device in accordance with an embodiment of the present invention.

Referring now to FIG. 1, a block diagram of a system 10 comprising a wireless host device 12 for connecting one or more wireless client devices 14 to a wired connection 18 is provided in accordance with an embodiment of the present invention. The wireless host device 12 may be, for example, a wireless access point, a router, a gateway and/or a bridge. The wireless host device 12 typically comprises one or more antennas, networking logic, wireless transceivers, processing capability, memory and storage, sufficient to wirelessly communicate. The wireless host device 12 may also execute software and/or firmware code. The one or more wireless client devices 14 may be, for example, laptops, tablets and/or mobile phones. The wireless host device 12 may communicate with the one or more wireless client devices 14 via a wireless network such as an IEEE 802.11 WLAN.

The wireless host device 12 may, in turn, communicate over a wired connection 18, either directly, or indirectly through a separate device, such as a broadband router 20, to a wired network 22, which may be part of an IEEE 802.3 (wired Ethernet) LAN, a WAN or the Internet. As such, the wireless host device 12 serves to connect the one or more wireless client devices 14 to the wired network 22.

The wireless host device 12 may also communicate via a separate network port or interface 24 with a personal computer (PC), laptop, smartphone, tablet, touch screen or other interactive device 26 operated by an end-user. The interactive device 26, typically comprising a processor, memory, storage and input/output as understood in the art, may execute software code in conjunction with the wireless host device 12. In addition, the interactive device 26 may graphically display to its monitor or otherwise visually or audibly indicate information collected by or generated by the wireless host device 12. Of course, in alternative embodiments, the functionality of the host device 12, the interactive device 26 and/or the router 20 may be combined in a single device or distributed in multiple devices, In varying proximities to the wireless host device 12, multiple neighboring wireless host devices 30, hereinafter labeled "A" through "O," are widely dispersed in locations to support access to the same or other wired networks. Some neighboring wireless host devices 30, such as neighboring wireless host device A, may be electromagnetically closer to the wireless host device 12, while other neighboring wireless host devices 30, such as neighboring wireless host device O, may be electromagnetically further from the wireless host device 12. A device may be "electromagnetically closer" than another device, regardless of being physically further, if, for example, the device provides a stronger, clearer signal, such as via a path free of obstructions.

Like the wireless host device 12, each of the neighboring host devices 30 may also be one or more of a wireless access point, a routers, a gateway and/or a bridge, and may also each typically comprise one or more antennas, networking logic, processing capability, memory and storage, sufficient to wirelessly communicate with others devices. Accordingly, the neighboring host devices 30 may also communicate with the one or more wireless client devices 14 or other wireless client devices via the same or other IEEE 802.11 WLANs.

The neighboring host devices 30 may be separated from one another, and/or separated from the wireless host device 12, by physical objects such as walls, buildings, etc. in addition, other power sources, such as microwave ovens, Bluetooth devices, baby monitors, cordless telephones, radio equipment, and so forth may be present. As a result, varying electromagnetic noise patterns 40 may be formed in the system 10, which may interfere with WLAN communications.

Figure 2:
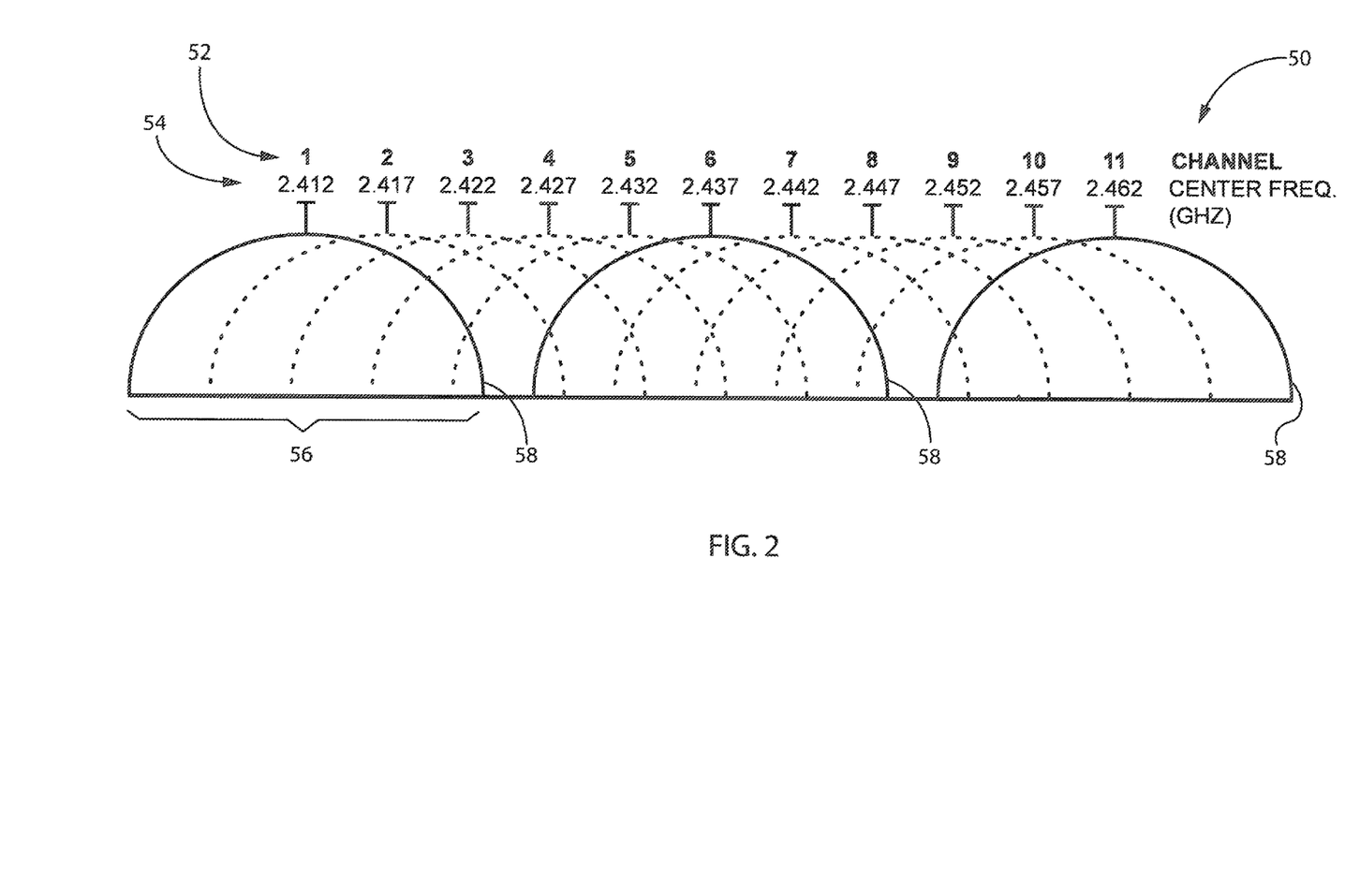
FIG. 2 is a graph illustrating an exemplar range of wireless networking frequencies divided according to channels in accordance with an embodiment of the present invention.

Referring now to FIG. 2, a graph 50 illustrates an exemplar range of wireless networking frequencies that may he used by the wireless host device 12. For example, if the wireless host device 12 implements an IEEE 802.11b WLAN, the wireless networking frequencies will be in the 2.4 GHz range.

The wireless networking frequencies are further divided according to WLAN channels 52. For example, in the IEEE 802.11b WLAN architecture, WLAN Channels 1 through 11 or (Channels 1 through 14) may be provided with respect to particular frequencies. Accordingly, each channel will operate at a particular center frequency 54, and with a particular bandwidth 56. For example, Channel 1 will operate at a center frequency of 2.412 GHz, and with a bandwidth of 20 MHz. Of course, implementations of other WLAN architectures will provide similar or other wireless networking frequencies and channels.

In addition, within the range of wireless networking frequencies, certain channels may be considered to be non-overlapping channels 58 in which there is no overlap of bandwidth 56. For example, channels 1, 6 and 11 are non-overlapping channels 58 insofar as there is no overlap of their bandwidths 56. Non-overlapping channels 58 may provide greater avoidance of interference and are thus generally preferred.

Figure 3:
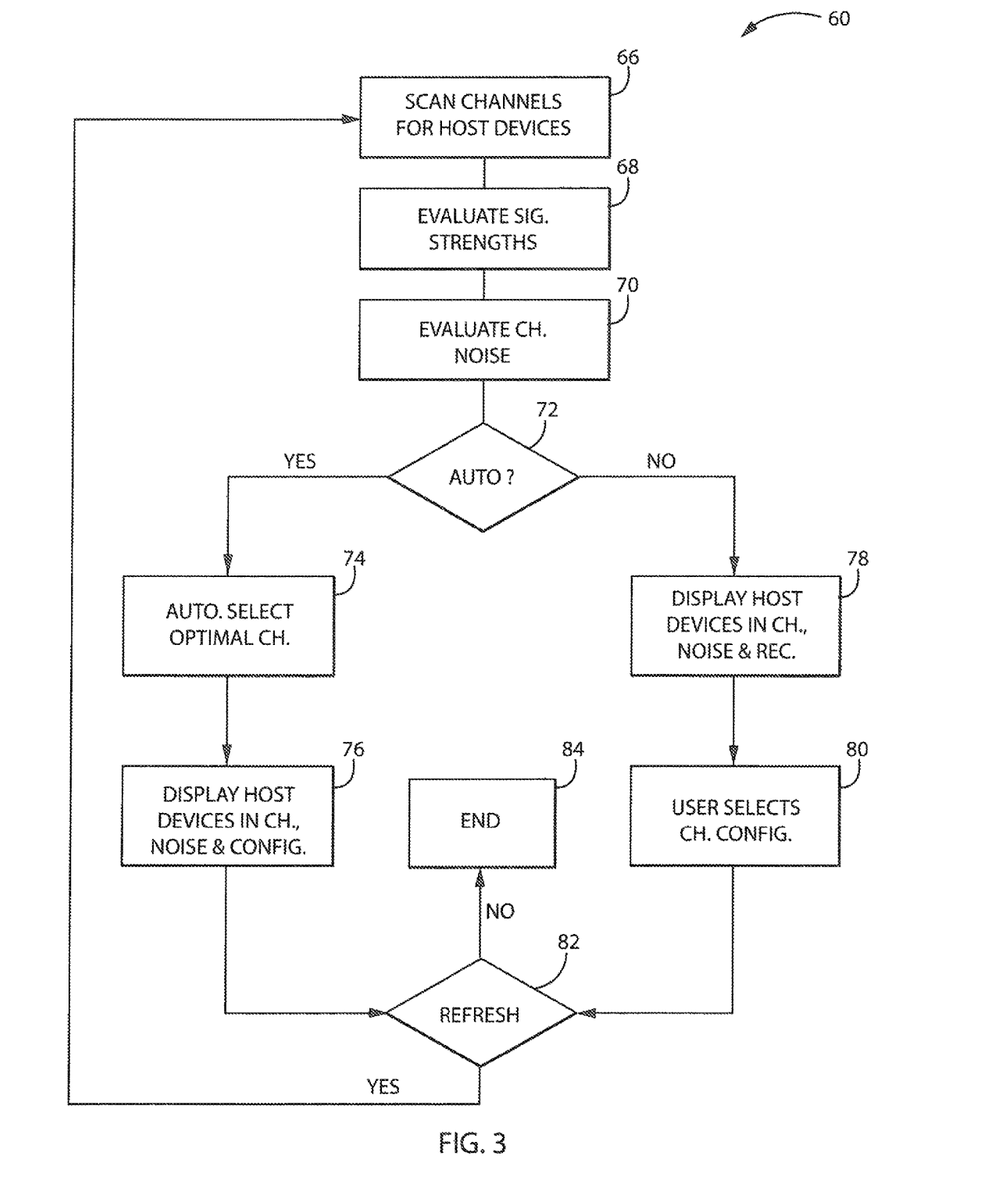
FIG. 3 is a process block diagram for configuring a wireless host device in accordance with an embodiment of the present invention.

Referring now to FIG. 3, a process block diagram of a process 60 for configuring the wireless host device 12 for connecting the one or more wireless client devices 14 to the wired network 22 in accordance with an embodiment of the present invention is illustrated. Beginning at process block 66, the wireless host device 12 scans a range of wireless networking frequencies divided according to WLAN channels for the presence of neighboring wireless host devices 30. Each of the neighboring wireless host devices 30 communicates via respective WLAN channels.

Next, at process block 68, the wireless host device 12 evaluates a signal strength measured in dB for each neighboring wireless host device identified in block 66. Next, at process block 70, the wireless host device 12 evaluates a noise level measured in dB for each channel in the range of wireless networking frequencies, independent of the presence of neighboring wireless host devices 30. In other words, the wireless host device 12 will evaluate a noise level in each possible channel for selection, The noise level in each possible channel may be measured as a signal-to-noise (SNR) ratio, and determination of the noise level in each channel furthers determining an optimal channel for configuration.

Next, in decision block 72, the process 60 will consider whether the wireless host device 12 is set for automatic configuration or for manual configuration. If the wireless host device 12 is optionally set for automatic configuration, the process will continue to process block 74. In process block 74, the wireless host device 12 will automatically select an optimal channel of operation for communicating with the one or more wireless client devices 14. The channel of operation may be selected using an algorithm which considers the noise level on each channel, the signal strength of each of the neighboring wireless host devices 30 scanned, and the number of neighboring wireless host devices 30 communicating via each respective channel.

Optionally, in process block 76, the wireless host device 12 may graphically display, such as via the interactive device 26, the neighboring wireless host devices 30 in their respective channels. The neighboring wireless host devices 30 displayed may be arranged as a function of their signal strengths, such as the neighboring wireless host devices 30 with stronger signals being shown closer to a common point which may represent the wireless host device 12. In addition, the noise level on each channel may be shown, including as a gradient, or continuum of greater noise to lesser noise, along with the automatically selected channel. Accordingly, a user may initiate further action based on such knowledge, such as overriding the automatic configuration in favor of the user's own manual configuration, selectively deploying new neighboring wireless host devices, configuring one or more of the wireless client devices 14 to the selected channel, and so forth.

However, in decision block 72, if the wireless host device 12 is set for manual configuration, the process 60 will continue instead to process block 78. In process block 78, the wireless host device 12 will graphically display, such as via the interactive device 26, the neighboring wireless host devices 30 in their respective channels. The neighboring wireless host devices 30 displayed may again be arranged as a function of their signal strengths, such as the neighboring wireless host devices 30 with stronger signals being shown closer to a common point which may represent the wireless host device 12. in addition, the noise level on each channel may again be shown, including as a gradient.

Optionally, in process block 78, the wireless host device 12 may still determine a recommended channel of operation for communicating with the one or more wireless client devices 14. The recommended channel of operation may be determined again using an algorithm which considers the noise level on each channel, the signal strength of each of the neighboring wireless host devices 30 scanned, and the number of neighboring wireless host devices 30 communicating via each respective channel. Accordingly, in graphically displaying the neighboring wireless host devices 30 in their respective channels, the process may also suggest to the user a channel of operation for the wireless host device 12 to communicate with the one or more wireless client devices 14. Next, in process block 80, upon viewing the information displayed, the user may manually select the channel for configuration, such as by selection of a channel icon generated and displayed using interactive software executing via the interactive device 26.

Finally, whether reaching process block 76 following automatic configuration, or reaching process block 80 following manual configuration, the collected and evaluated information may optionally be updated and refreshed for any subsequent action that may be needed, depending on decision block 82. Such subsequent action may include, for example, changing the configuration of the wireless host device 12 following the deployment of new neighboring wireless host devices 30. In decision block 82, if the wireless host device 12 is configured for subsequent refresh, whether by user selection or by default, the process 60 may return to process block 66 following a predetermined delay. The delay may also be configured by user selection or by default, and serves to provide sufficient time for changes in the system 10 to merit a subsequent update. Such delay may be, for example, on the order of hours, days, months or years. However, in decision block 82, if the wireless host device 12 is not configured for subsequent refresh, then the process may end at process block 84.

Figure 4:
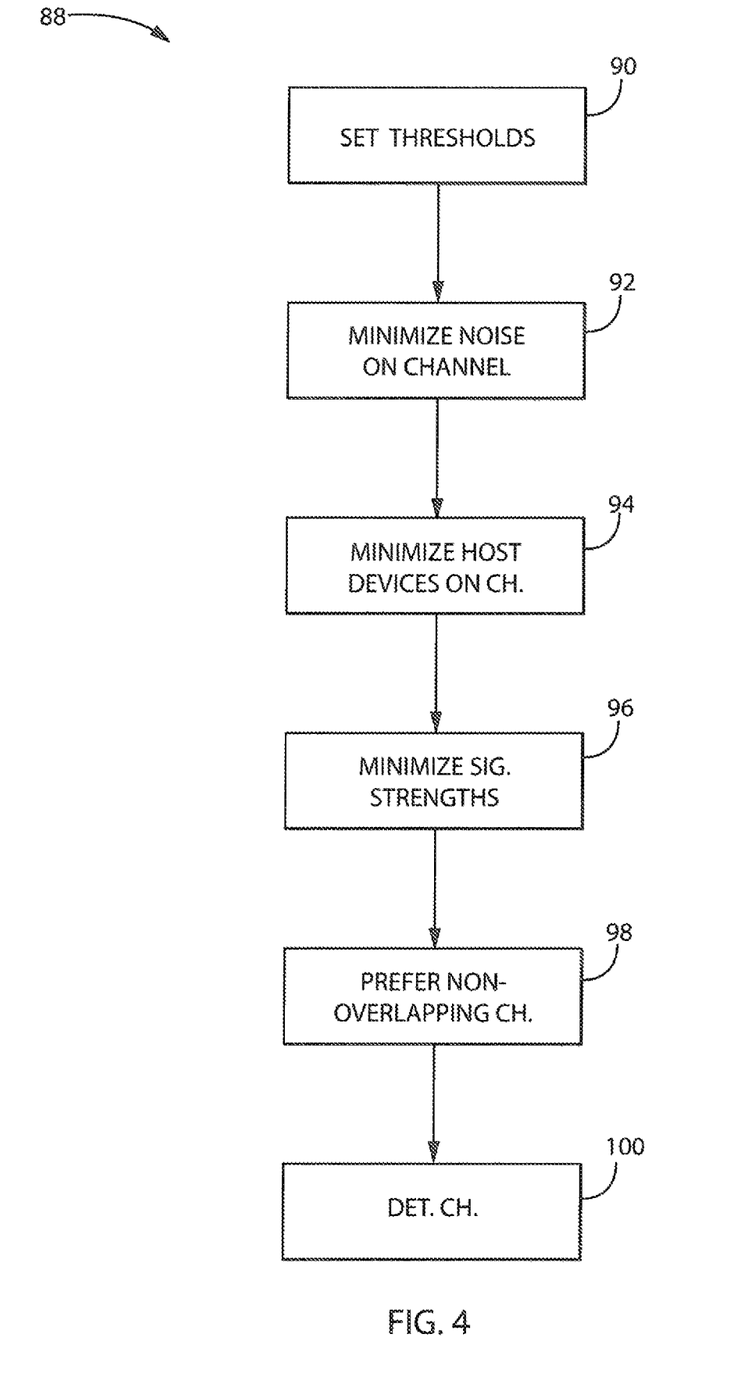
FIG. 4 is a process block diagram for an exemplar algorithm for determining a channel of operation for a wireless host device in accordance with an embodiment of the present invention.

Referring now to FIG. 4, an algorithm 88 for determining a channel of operation for a wireless host device in accordance with an embodiment of the present invention is provided. Beginning at process block 90, the algorithm 88 may assign predetermined thresholds for a maximum tolerable noise level, a maximum tolerable signal strength and/or a maximum tolerable number of neighboring wireless host devices 30 on a channel. For example, the algorithm may assign a maximum tolerable noise level of −10 dB on a particular channel, and/or a maximum tolerable signal strength of −50 dB as generated by any neighboring wireless host device 30 on a particular channel, and/or a maximum tolerable number of 5 neighboring wireless host devices 30 on a particular channel, any one of which will cause the algorithm to eliminate the channel as a potential selection choice. Of course, multiple threshold levels may be assigned within any particular category, which may facilitate multiple levels of potential selection choices.

Next, in process block 92, the noise level on each particular channel may be ranked to determine channels with minimized noise levels, or preferably no detectable noise. Channels with a maximum noise level below the predetermined threshold assigned in process block 90 may be flagged as potential selection choices.

Next, in process block 94, the signal strength generated by neighboring wireless host devices 30 on a particular channel may be ranked to determine channels containing minimized host device signal strengths, or preferably no signals at all. Channels with a maximum signal strength below the predetermined threshold assigned in process block 90 may be further flagged as potential selection choices.

Next, in process block 96, the number of neighboring wireless host devices 30 on a particular channel may be ranked to determine channels containing the least number of neighboring wireless host devices 30, or preferably no neighboring wireless host devices 30 at all. Channels with a maximum number of neighboring wireless host devices 30 below the predetermined threshold assigned in process block 90 may be flagged yet again as potential selection choices.

Next, in process block 98, the algorithm may optionally further consider frequency overlap of channels, or any other desirable characteristic which may be set by the user and/or preconfigured and give preference, to such channels. For example, if a particular channel is flagged multiple times as described above and, therefore, remains a potential selection choice, and if the channel is a non-overlapping channel, the channel may be flagged again as preferred over other potential selection choices.

Finally, in process block 100, the algorithm 88 determines a channel from the potential selection choices. In the event of multiple equal potential selection choices, a tie-breaking scheme may be employed, such as determining a channel having the lowest WLAN channel number.

Figure 5:
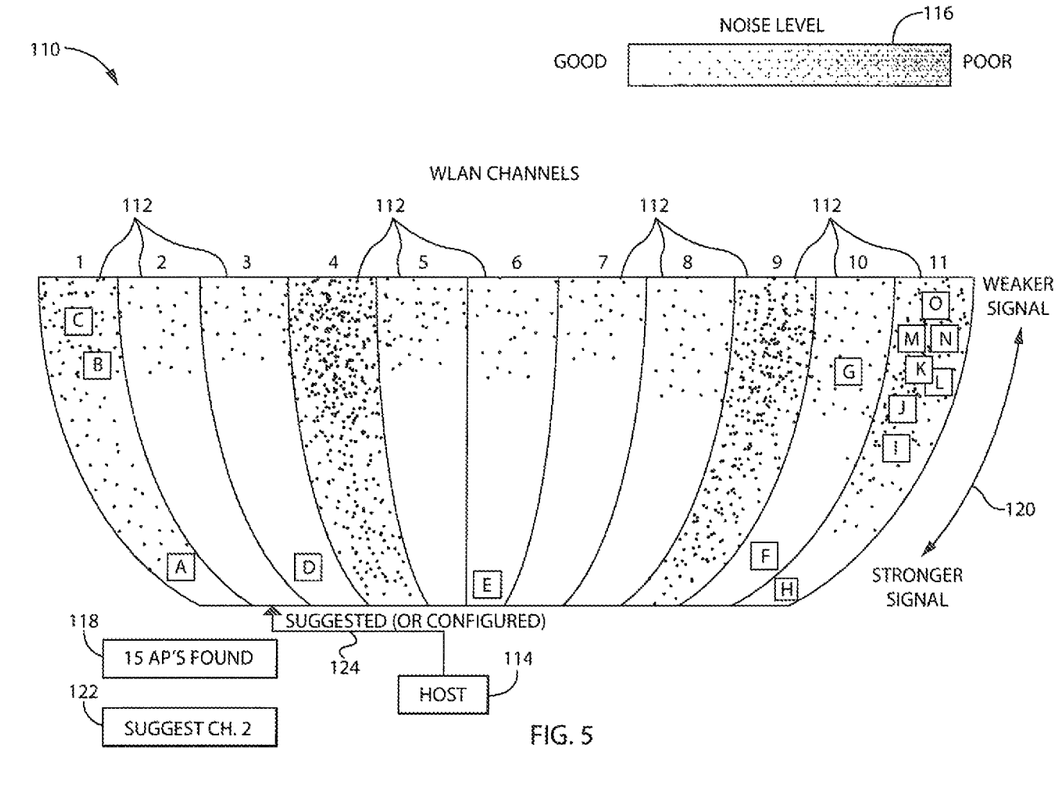
FIG. 5 is a graphical display which may be visually displayed to a user, illustrating the noise level on each channel and the neighboring wireless host devices in their respective channels, wherein the neighboring wireless host devices are arranged as a function of their signal strengths, in accordance with an embodiment of the present invention.

Referring now to FIG. 5, a graph 110 with data and surrounding descriptions may be visually displayed to a user, such as via the interactive device 26, in accordance with an embodiment of the invention. Graphical display of the graph 110 assists the user in monitoring the system 10, monitoring the automatic selection of the wireless host device 12 and/or manually selecting a channel for the wireless host device 12. The graph 110 may be take any advantageous form for intuitively displaying WLAN information as described above with respect to FIGS. 3 and 4, such as a generally inverted bell "or balloon" shape. The graph 110 may be divided into multiple bands 112, each corresponding to a respective WLAN channel, such as Channels 1 through 11 as described above with respect to FIG. 2, The WLAN channels may be numbered across the wider top portion of the inverted bell shape, each channel number aligned with a corresponding band 112. in addition an icon 114 for the wireless host device 30 may be placed, for example, on the narrower bottom portion of the inverted bell shape, which may serve to assist the user in visually orienting the wireless host device 12 as it relates to the system 10.

Within each band 112, the neighboring wireless host devices 30 communicating via the respective channel corresponding to the band 112 are shown, along with their respective network names and/or other identifying information. In addition, the relative positions of the neighboring wireless host devices 30 corresponding to the band 112 are shown varying in accordance with their respective signal strengths. For example, for channel 1, in the corresponding band 112, the neighboring wireless host device A, having a relatively stronger signal strength, is shown toward the bottom portion of the band 112, closer to the icon 114. However, also for channel 1, and in the corresponding band 112, the neighboring wireless host device C, having a relatively weaker signal strength, is shown toward the upper portion of the band 112, further from the icon 114. Accordingly, the arrangement of the neighboring wireless host devices 30 are shown in their respective channels with their respective signal strengths as distance indicators.

Comparison of signal strengths between the neighboring wireless host devices 30 in differing bands 112 may also be visually accomplished. For example, the graph 110 may convey that signal strength from the neighboring wireless host device A in Channel 1 is stronger than the signal strength from the neighboring wireless host device F in Channel 10. This may be shown, for example, by visually depicting the neighboring wireless host device A as proportionally closer to the icon 114 than the neighboring wireless host device F. and/or the neighboring wireless host device A as proportionally closer to the bottom portion of its respective band than the neighboring wireless host device F.

In addition, each band 112 may display the noise level for each channel as a gradient, or a continuum of greater noise to lesser noise, with respect to each of the bands 112. Indeed, noise generally increases further from the host device. Accordingly, the graph 110 may convey that less noise occurs toward the bottom portion of the bands 112, closer to the icon 114, and more noise occurs toward the upper portion of the bands 112, further from the icon 114. This may be shown, for example, by stippling, shading, darkening, coloring, banding, shadowing or any other technique to depict a gradient or continuum of noise. For example, with respect to channel 1, the band 112 includes greater stippling nearer the top portion of its respective band, corresponding to more noise further from the icon 114, and less stippling nearer the bottom portion of its respective band, corresponding to less noise closer to the icon 114.

Comparison of the noise levels between differing bands 112 may also be visually accomplished. For example, the graph 110 may convey that there is a significantly lower noise level on Channel 2 as compared to Channel 4. For example, the overall stippling on Channel 2 is less than the overall stippling on Channel 4.

The graph 110 may also include descriptive text, such as an indicator 116 of noise level from "good" to "poor," the total number of AP's found 118, the orientation 120 of "weaker signals" to "stronger signals," the suggested channel (or the automatically configured channel) for operation 122. The graph 110 may also include an association or link 124 from the icon 114 to a particular band 112, thereby visually illustrating which channel is suggested to the user (or optionally which channel has been automatically configured if the host device is configured for automatic configuration).

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A wireless host device for connecting a wireless client device to a wired network, the wireless host device including an electronic processor communicating with a wireless transceiver and executing a program stored in a non-transient medium on the electronic processor to:
   (a) scan a range of wireless networking frequencies divided according to channels for the presence of neighboring wireless host devices, wherein neighboring wireless host devices communicate via respective channels;
   (b) evaluate a signal strength from each neighboring wireless host device scanned in a respective channel to the wireless host device;
   (c) evaluate a noise level for each of the channels independent of the presence of neighboring wireless host devices;
   (d) determine a channel of operation for the wireless host device to communicate with the wireless client device, wherein the determined channel of operation is determined by considering the noise level on each channel, the signal strength of each neighboring wireless host device scanned, and the number of neighboring wireless host devices communicating via each respective channel;
   (e) transmit data using the determined channel of operation, and
   (f) display a graph of the neighboring wireless host devices as icons in bands corresponding to the respective channels, wherein:
      (i) the signal strengths from neighboring wireless host devices are processed to display the icons with corresponding distances on the graph in respective channels so that neighboring wireless host devices having stronger signals are displayed as icons closer to a common point representing the wireless host device, and neighboring wireless host devices having weaker signals are displayed as icons further from the common point representing the wireless host device,
      (ii) the noise levels for each of the channels are processed to display continuums of greater noise to lesser noise with distance on the graph in respective channels.

2. The wireless host device of claim 1, further comprising graphically displaying the noise level on each channel with respect to an icon representing the wireless host device at the common point.

3. The wireless host device of claim 1, wherein the noise level on each channel is displayed as a gradient.

4. The wireless host device of claim 1, wherein the wireless host device communicates via IEEE 802.11 protocol.

5. The wireless host device of claim 4, wherein the wireless networking frequencies are divided according to channels in the 2.4 GHz range.

6. The wireless host device of claim 4, wherein the wireless networking frequencies are divided according to channels in the 5 GHz range.

7. The wireless host device of claim 4, wherein the channels include at least eleven channels, each channel spaced apart by at least 5 MHz.

8. The wireless host device of claim 1, wherein the algorithm seeks to minimize at least one of the noise level on the determined channel of operation, the number of neighboring wireless host devices on the determined channel of operation and the signal strengths of the neighboring wireless host devices on the determined channel of operation.

9. The wireless host device of claim 1, wherein the algorithm further considers frequency overlap of channels when determining a channel of operation.

10. A method for configuring a wireless host device for connecting a wireless client device to a wired network, the method comprising:
   (a) from a wireless host device, scanning a range of wireless networking frequencies divided according to channels for the presence of neighboring wireless host devices, wherein neighboring wireless host devices communicate via respective channels;
   (b) using a wireless transceiver in the wireless host device, evaluating a signal strength from each neighboring wireless host device scanned in a respective channel to the wireless host device;
   (c) using the wireless transceiver in the wireless host device, evaluating a noise level for each of the channels independent of the presence of neighboring wireless host devices;
   (d) transmitting, from the wireless host device, information for graphically displaying the neighboring wireless host devices as icons in bands corresponding to the respective channels, including:
      (i) the signal strengths from neighboring wireless host devices with corresponding distances on a graph in respective channels so that neighboring wireless host devices having stronger signals are displayed as icons closer to a common point representing the wireless host device, and neighboring wireless host devices having weaker signals are displayed as icons further from the common point representing the wireless host device, and
      (ii) the noise levels for each of the channels as continuums of greater noise to lesser noise with distance on the graph in respective channels; and
   (e) suggesting to a user a channel of operation for the wireless host device to communicate with the wireless client device, wherein the suggested channel of operation is determined using an algorithm considering the noise level on the channel, the number of neighboring wireless host devices on the channel, and the signal strengths of the neighboring wireless host devices on the channel.

11. The method of claim 10, wherein the algorithm seeks to minimize at least one of the noise level on the suggested channel, the number of neighboring wireless host devices on the suggested channel, and the signal strengths of the neighboring wireless host devices on the suggested channel.

12. The method of claim 10, wherein the noise level on each channel is displayed as a gradient.

13. The method of claim 10, wherein the wireless host device communicates via the IEEE 802.11 protocol.

14. The method of claim 13, wherein the channels include fourteen channels.

15. A program stored in a non-transitory computer-readable storage medium executable on an electronic computer operable to:

(a) scan, from a wireless host device, a range of wireless networking frequencies divided according to channels for the presence of neighboring wireless host devices, wherein neighboring wireless host devices communicate via respective channels;

(b) use a wireless transceiver in the wireless host device to evaluate a signal strength from each neighboring wireless host device scanned in a respective channel to the wireless host device;

(c) use the wireless transceiver in the wireless host device to evaluate a noise level for each of the channels independent of the presence of neighboring wireless host devices;

(d) transmit, from the wireless host device, information for graphically displaying the neighboring wireless host devices as icons in bands corresponding to the respective channels, including:

(i) the signal strengths from neighboring wireless host devices with corresponding distances on a graph in respective channels so that neighboring wireless host devices having stronger signals are displayed as icons closer to a common point representing the wireless host device, and neighboring wireless host devices having weaker signals are displayed as icons further from the common point representing the wireless host device, and (ii) the noise levels for each of the channels as continuums of greater noise to lesser noise with distance on the graph in respective channels; and (e) suggest to a user a channel of operation for the wireless host device to communicate with the wireless client device, wherein the channel of operation is suggested using an algorithm considering the noise level on the channel, the number of neighboring wireless host devices on the channel, and the signal strengths of the neighboring wireless host devices.

16. The program of claim 15, wherein the algorithm seeks to minimize the noise level on the channel, then minimize the number of neighboring wireless host devices on the channel and the signal strengths of the neighboring wireless host devices on the channel.

17. The program of claim 15, wherein the algorithm assigns predetermined thresholds for a maximum amount of at least one of noise level, signal strength, and number of neighboring wireless host devices on a channel.

* * * * *